United States Patent [19]
Orzel et al.

[11] 3,966,268
[45] June 29, 1976

[54] INERTIA LOAD SENSING BRAKE VALVE

[75] Inventors: Edward S. Orzel, Cleveland; Richard G. Thrush, North Olmstead, both of Ohio

[73] Assignee: The Weatherhead Company, Cleveland, Ohio

[22] Filed: Mar. 12, 1975

[21] Appl. No.: 557,677

[52] U.S. Cl. ............................. 303/24 F; 303/6 C
[51] Int. Cl.² ..................... B60T 8/26; B60T 13/06
[58] Field of Search ............. 188/349; 303/6 C, 6 R, 303/24 C, 24 F, 24 B, 24 BB

[56] References Cited
UNITED STATES PATENTS
3,795,424   3/1974   Lewis .................................. 303/6 C

*Primary Examiner*—Duane A. Reger
*Attorney, Agent, or Firm*—McNenny, Pearne, Gordon, Gail, Dickinson & Schiller

[57] ABSTRACT

The disclosed motor vehicle hydraulic brake system includes a master cylinder supplying fluid pressure to a front brake circuit and to a rear brake circuit. The rear brake circuit includes a proportioning valve which reduces the pressure supplied to the rear wheel brakes. The rear brake circuit also includes a control circuit. In the event of front and rear braking pressures exceeding predetermined pressure levels, the control circuit modifies the operation of the proportioning valve so that the proportional relationship of the proportioning valve closely approximates a 0.4g deceleration line until the theoretically ideal front to rear pressure relationship for the particular loading condition of the vehicle at the 0.4g deceleration rate is reached. The proportioning valve then closely approximates the theoretically ideal front to rear pressure relationship for the particular loading condition of the vehicle at all higher braking pressures and higher deceleration rates.

24 Claims, 8 Drawing Figures

INERTIA LOAD SENSING BRAKE VALVE

BACKGROUND OF THE INVENTION

This invention relates generally to pressure regulating valves, and more specifically to pressure proportioning valves that are operable to maintain the outlet pressure a differential below the inlet pressure after a predetermined inlet pressure has been reached or exceeded. Still more specifically, this invention relates to such pressure proportioning valves that are particularly adapted for use in motor vehicle hydraulic brake systems.

In motor vehicle hydraulic brake systems, it is sometimes desirable to provide a lower fluid pressure to the rear wheel brakes than to the front wheel brakes under severe braking conditions. This prevents permature lock-up of the rear wheel brakes, which might otherwise be caused by a weight transfer from the rear wheels to the front wheels upon rapid deceleration. It is also desirable, particularly when the motor vehicle is a two axle truck which has a significantly greater load on the rear wheels when the truck is loaded than when it is empty, to provide a different relationship between front and rear wheel brake pressures when the vehicle is fully loaded than when the vehicle is empty.

Two prior art proportioning valves which maintain the rear brake pressure below the front brake pressure and which provide different pressure reductions for a fully loaded vehicle than for an empty vehicle are disclosed in U.S. Pat. No. 3,773,362. The two valves disclosed in this patent provide a rear brake pressure which is proportional to but less than the front brake pressure over one range of operation and then cut off all further increases in rear brake pressure.

Another type of pressure proportioning valve is disclosed in U.S. Pat. No. 3,467,440, which discloses a valve which follows one pressure reduction curve under normal operations and which follows a different pressure reduction curve when there is a pressure failure in the front wheel brakes. Additionally, pressure limiting devices which terminate further increases in braking pressure when a predetermined deceleration rate is reached are known such as disclosed in U.S. Pat. No. 3,403,946.

SUMMARY OF THE INVENTION

The present invention departs from these prior art brake systems and valves by providing a motor vehicle hydraulic brake system in which the rear brake pressure is modified to closely approximate a fixed deceleration line for the vehicle until the theoretically ideal front and rear brake pressures for any loading condition whatsoever of the vehicle at the fixed deceleration line are reached.

More specifically, the invention provides a motor vehicle hydraulic brake system which includes a front brake circuit, a rear brake circuit having a proportioning valve for reducing the pressure supply to the rear wheel brakes, and a control means altering the pressure proportioning characteristics of the proportioning valve in accordance with the load of the vehicle. The proportioning valve includes a proportioning piston and a valve responsive to movement of the proportioning piston to maintain increases in rear brake pressure proportional to but less than increases in front brake pressure when the braking pressures are below predetermined pressure levels and when the deceleration rate of the vehicle is below a fixed deceleration rate. When the braking pressures increase beyond the predetermined pressure levels without decelerating the vehicle to the fixed deceleration rate (thereby indicating that the vehicle is not empty since an empty vehicle would be decelerated at the predetermined deceleration rate when the predetermined pressure levels are exceeded), the control means begins to modify the proportioning characteristics of the proportioning valve.

The control means includes a control chamber and a control member operatively connected to the valve of the proportioning valve. The control member urges the valve open in response to a pressure signal in the control chamber when the predetermined pressure levels are reached and the fixed deceleration rate is not attained. This alters the proportional relationship of the proportioning valve to closely approximate the fixed deceleration line for the vehicle. When the braking presures become sufficient to decelerate the vehicle at the fixed deceleration rate (thereby indicating the exact loading condition of the vehicle), an inertia responsive valve in the control means closes to prevent further increases in control chamber pressure and to lock the control chamber pressure in the control chamber. The locked-in and constant control chamber pressure during further increases in braking pressure causes the proportioning valve to maintain a proportional relationship between further increases in front and rear brake pressures which is the same as the unmodified proportional relationship of the valve.

BRIEF DESCRIPTION OF THE DRAWING

These and other aspects, principles and advantages of the present invention are incorporated in the preferred embodiment of the invention shown in the drawings, wherein.

DETAILED DESCRIPTION OF THE DRAWINGS

Figure 1:
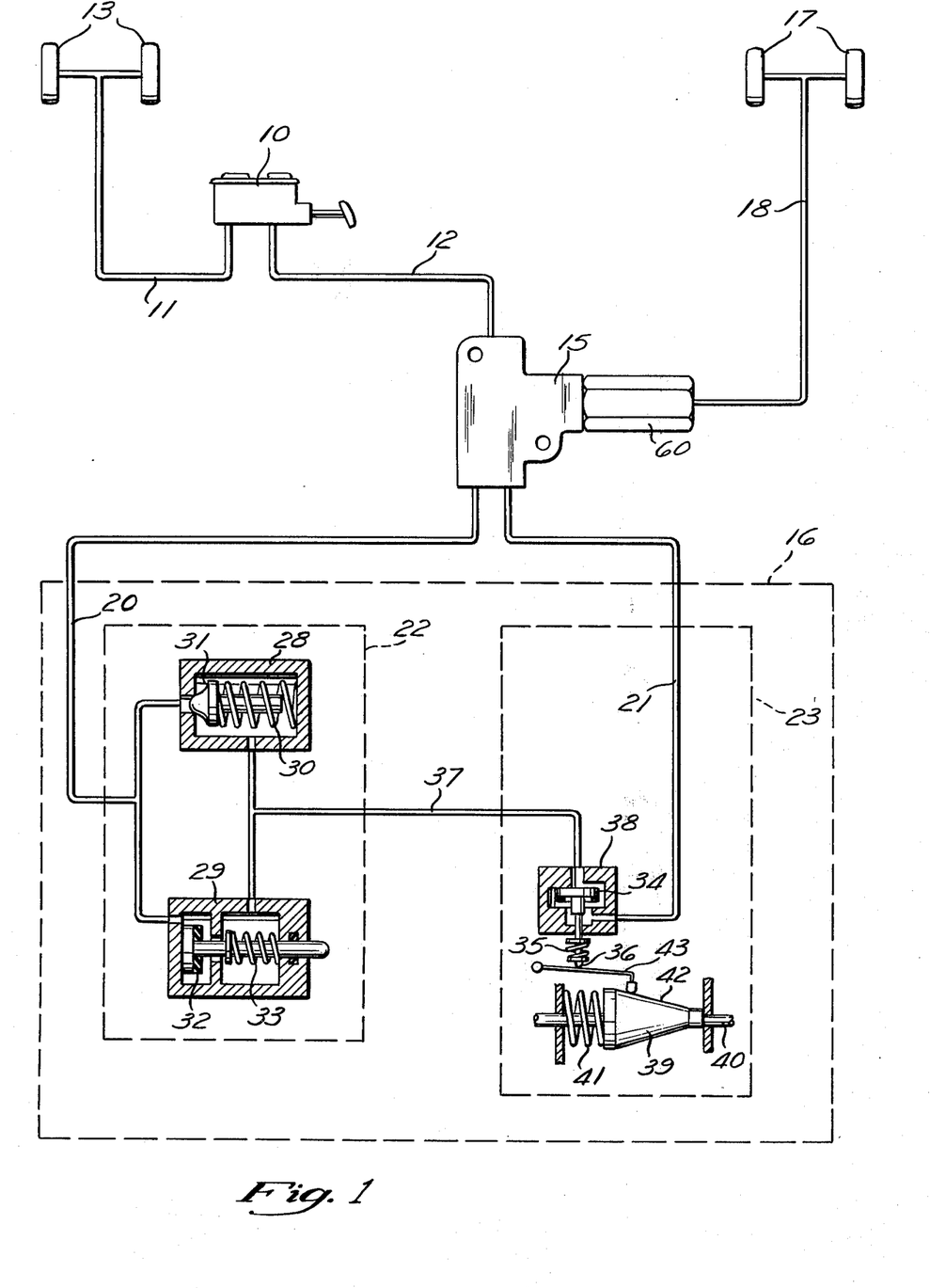
FIG. 1 is a schematic diagram of a two axle truck having a hydraulic brake system according to the principles of the invention which includes a proportioning valve and a control circuit.

Referring to the drawings in greater detail, the motor vehicle shown schematically in FIG. 1 includes a hydraulic brake system having a master cylinder 10, a front brake circuit supply line 11, and a rear brake circuit supply line 12 for separately supplying fluid pressure to the front brake circuit and the rear brake circuit. The pressure in the lines 11 and 12 is equal under all operating conditions except when there is a failure in either the front brake circuit or the rear brake circuit. The line 11 supplies fluid pressure to the slave cylinders of the front wheels 13. The line 12 supplies fluid pressure to a proportioning valve 15 and to a control circuit 16, and the proportioning valve 15 in turn supplies fluid pressure to the slave cylinders of rear wheels 17 through a line 18.

STRUCTURE AND OPERATION OF CONTROL CIRCUIT

Referring still to FIG. 1, the control circuit 16 includes an inlet 20 which is in open fluid pressure communication with the line 12 under all conditions as explained in greater detail below, and an outlet 21. The control circuit 16 also includes a pressure hold-off section 22 and a pressure locking section 23. The function of the pressure hold-off section 22 is to prevent modification of the proportioning characteristics of the proportioning valve 15 at lower braking pressures. This is accomplished by preventing substantial pressure build up in the outlet 21 of the control circuit until a predetermined pressure is reached as explained in greater detail below. The function of the pressure locking section 23 is to cause the proportioning valve 15 to assume its unmodified proportioning ratio at higher braking pressures when a predetermined deceleration rate is reached. This is accomplished by locking the control pressure in the outlet 21 of the control circuit 16 when the predetermined deceleration rate is reached as explained in greater detail below.

The pressure hold-off section 22 includes a hold-off and reducing valve 28. When the pressure in the inlet 20 begins to increase, the hold-off and reducing valve 28, in a well-known manner, remains closed until sufficient pressure is built up in the inlet 20 to overcome the preload of spring 30 and open the valve 31. Further increases in pressure in the inlet 20 then result in equal increases on the outlet side of the valve 28.

The pressure hold-off section 22 also includes a return flow valve 29 having a valve member 32 and a light biasing spring 33. When pressure in the inlet 20 initially begins to increase from zero gauge pressure, the valve member 32 of the return flow valve 29 closes against the light biasing force of spring 33 in a well-known manner.

The pressure locking section 23, which is arranged in series with the pressure hold-off section 22 through a line 37, includes a normally open shut-off valve 38. The pressure locking section 23 also includes an inertia weight 39 which is slidably disposed on a horizontal rod 40 and which is spring biased to the right as viewed in FIG. 1 by a spring 41. The inertia weight 39 weighs 2 lbs. (907 grams) in the preferred embodiment and includes a conical cam surface 42. An actuator 43 rides on the cam surface 42 to control the closing of the shut-off valve 38.

When the valve 38 is in the open position shown in FIG. 1, open fluid pressure communication is maintained from the line 37 to the control circuit outlet 21. When the motor vehicle rate of deceleration is equal to or greater than a predetermined rate (which is 0.4g in the preferred embodiment where $g$ is the acceleration of gravity approximately equal to 32 ft./sec.$^2$ or 9.8 m./sec.$^2$) the inertia weight 39 moves to the left as viewed in FIG. 1 against the bias of the spring 41. This causes the actuator 43 to move downwardly as viewed in FIG. 1 to close the valve 38. After closure of the valve 38, the control pressure in the outlet 21 is locked in the outlet 21 so that further increases in the pressure in the inlet 20 are isolated from the outlet 21.

Figures 2, 8:
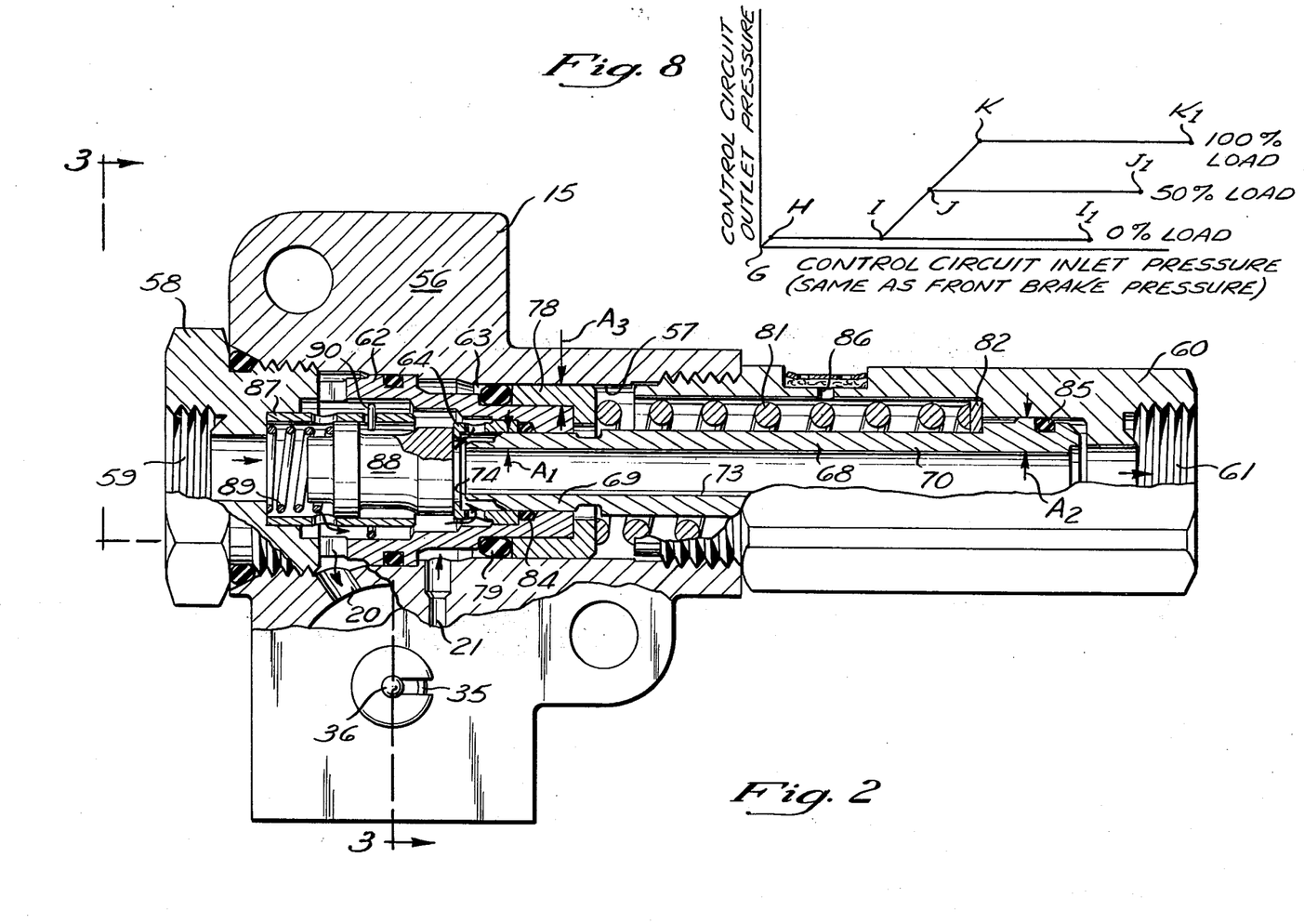
FIG. 2 is an enlarged side elevational view, partly in cross-section, of the proportioning valve used in the system shown in FIG. 1.
FIG. 8 is a graphical representation of the relationship between inlet and outlet pressure of the control circuit used in the system shown in FIG. 1.

The mode of operation of the control circuit 16 is shown graphically in FIG. 8. Initial increases in pressure in the inlet 20 result in equal increases in pressure in the outlet line 21. This is because the return flow valve 29 and the shut-off valve 38 are both open when pressure beings to build from zero gauge pressure, and this portion of the operation of the valve is indicated by line GH in FIG. 8.

A slight increase in pressure causes the return flow valve 29 to close at point H, so that further increases in pressure in the inlet line 20 do not cause any further increase in pressure in the outlet 21. This portion of the operation of the control circuit 16 is indicated by line HI in FIG. 8.

When the inlet and outlet pressures indicated at point I are reached, the pressure in the inlet 20 is sufficient to overcome the force of the spring 30 of the hold-off and reducing valve 28. This causes the valve member 31, in a well-known manner, to operate so that further increases in pressure in the inlet 20 cause equal increases in pressure in the outlet 21. This portion of the operation of the valve 16 is shown by line IJK in FIG. 8. During this portion of the operation of the control circuit 16 along line IJK, it has been assumed that the shut-of valve 38 remains in its open condition as shown in FIG. 1.

As stated above, the inertia weight 39 moves to the left as viewed in FIG. 1 to close the shut-off valve 38 when the rate of deceleration of the motor vehicle is equal to or greater than 0.4g. If the motor vehicle is unloaded, the predetermined or fixed deceleration rate of 0.4g which causes closing of the shut-off valve 38 is reached immediately after the control circuit inlet and outlet pressures are at the pressure levels indicated by point I in FIG. 8. Because of this closing of the valve 38, further increases in pressure in the inlet 20 do not result in any further increases in pressure in the outlet 21. This portion of the operation of the control circuit when the vehicle is unloaded is shown in FIG. 8 by line II$_1$.

If the motor vehicle is loaded to 50 percent of its carrying capacity, the shut-off valve 38 does not close when the pressures indicated at point I are reached. This is because greater braking pressures are required to decelerate the more heavily loaded vehicle at the rate of 0.4g to cause the shut-off valve 38 to close. The point at which system pressures are sufficient to decelerate the 50 percent loaded vehicle at a rate of 0.4g to close the valve 38 is indicated at point J in FIG. 8. Further increases in pressure in the control circuit inlet 20 after the valve 38 closes will result in no further increases in pressure in the outlet 21, as indicated by the line JJ$_1$ in FIG. 8.

In a similar manner, when the vehicle is loaded to 100 percent of its capacity, the pressures indicated at point K in FIG. 8 must be reached before a deceleration rate of 0.4g is reached to close the shut-off valve 38. This will result in no further increases in pressure in the outlet 21 even when the pressures in the inlet 20 are increased, as indicated by line KK$_1$ in FIG. 8.

The control circuit 16 functions in this manner not only at the three particular loading conditions illustrated in FIG. 8, but also at any partial loading condition whatsoever along line IJK since the fixed deceleration rate of 0.4g will be reached for the vehicle as the front brake pressure (which is the same as the control circuit inlet pressure) increases along line IJK. In this manner, the control circuit 16 provides a pressure signal to the proportioning valve 15 through the outlet 21. The magnitude of the pressure signal is greater when the vehicle is heavily loaded and is lesser when the vehicle is lightly loaded. Additionally, the pressure signal which is produced by the control circuit 16 is locked in the outlet 21 when the fixed deceleration rate of 0.4g is reached.

Figure 3:
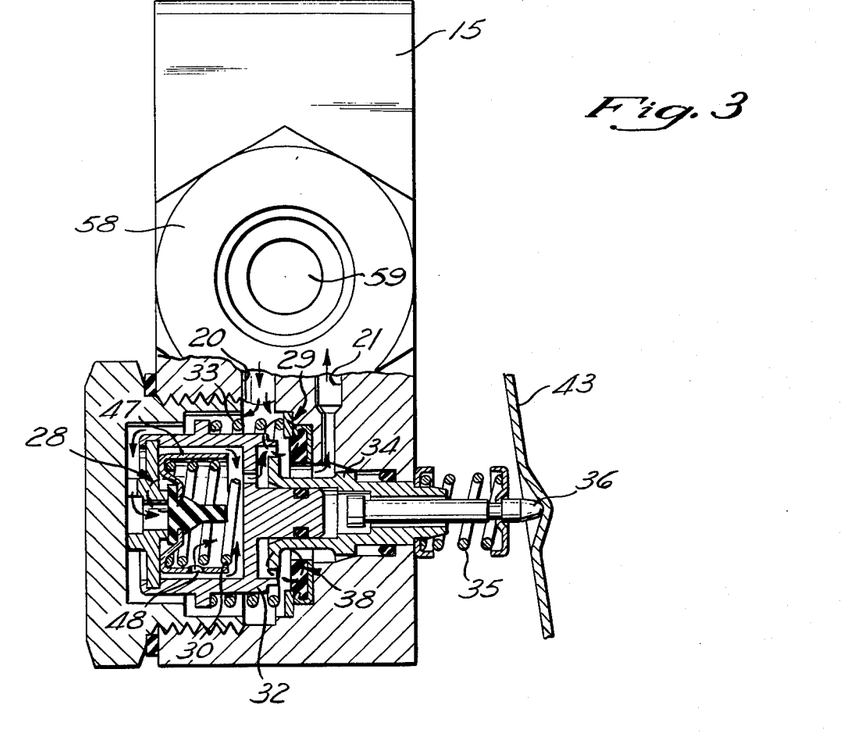
FIG. 3 is an end view, partly in cross-section, taken along reference view line 3—3 in FIG. 2 and showing a portion of the control circuit which is disposed within the housing of the proportioning valve.
Figure 4:
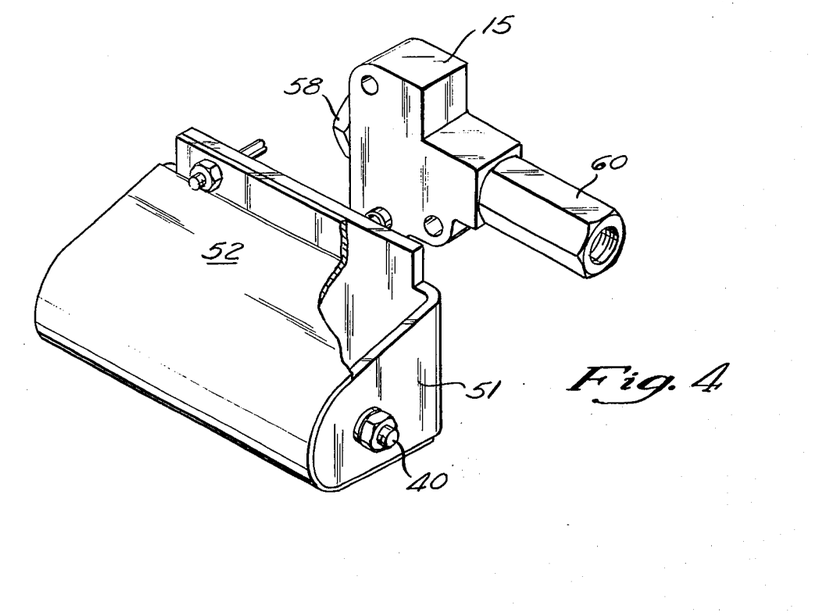
FIG. 4 is an exploded perspective view, with portions broken away for clarity, of the proportioning valve and control circuit shown schematically in FIG. 1.

The structural details of the preferred embodiment of the control circuit 16 shown schematically in FIG. 1 are shown in detail in FIGS. 3 through 6. As best shown in FIG. 4, the valving components of the control circuit 16 are disposed in the housing of the proportioning valve 15, while the inertia weight of the control circuit 16 is secured to the outside of the housing of the proportioning valve 15.

The structural details of the reducing valve 28 are best shown in FIG. 3 and include the spring 30 and the valve member 31 previously shown schematically in FIG. 1. Additionally, the reducing valve 28 includes a generally cup-shaped metering sleeve 47. In the event of a pressure spike in the inlet 20 (that is, a transient momentary increase and decrease in pressure) when the return flow valve 29 is closed, the metering sleeve 47 is moved from its position shown in FIG. 3 to a rightmost position in which its right annular end face engages a confronting surface to prevent fluid flow from the inlet 20 and around the exterior of the metering sleeve 47 to the outlet 21. When this occurs, flow from the inlet 20 to the outlet 21 must flow through a metering orifice 48. Because of this, any such pressure spike in the inlet 20 is not transmitted to the outlet 21 so that the pressure spike dos not alter the control signal in the outlet 21.

The structural details of the return flow valve 29 are also shown in FIG. 3. The valve member 32 of the return flow valve 29 has a portion of its right end face exposed to atmospheric pressure, so that the valve member 32 closes to prevent fluid flow therethrough from the inlet 20 to the outlet 21 when pressures begin to build in the inlet 20.

As further shown in FIG. 3, the shut-off valve 38 includes the valve member 34 and the spring 35 and the actuating rod 36. The actuator 43 normally presses the rod 36 against the bias of spring 35 so that the spring 35 acts between the rod 36 and the valve member 34 to hold the valve member 34 in the open position shown in FIG. 3 to hold the shut-off valve 38 open whenever the deceleration rate of the vehicle is less than 0.4g. When the actuator 43 swings to the right as viewed in FIG. 3 due to displacement of the inertia weight 39, the rod 36 moves to the right to relieve the bias of the spring 35 on the valve member 34 so that any further pressure increase moves the valve member 34 to its closed position. This locks the pressure signal in the outlet 21 so that any further increases in pressure in the inlet 20 do not increase the pressure in the outlet 21.

When the operator of the vehicle releases the brakes and the pressures in the inlet 20 decrease, the inertia weight returns to its rest position and the actuator 43 returns to its position shown in FIG. 3. The spring 35 then returns the valve member 34 to the left to its open position. Because the valve member 32 of the return flow valve 29 has one area exposed to inlet pressure, a decrease in inlet pressure also causes the return flow valve 29 to open so that the pressure in the outlet 21 is relieved through the valves 38 and 29.

Figure 5:
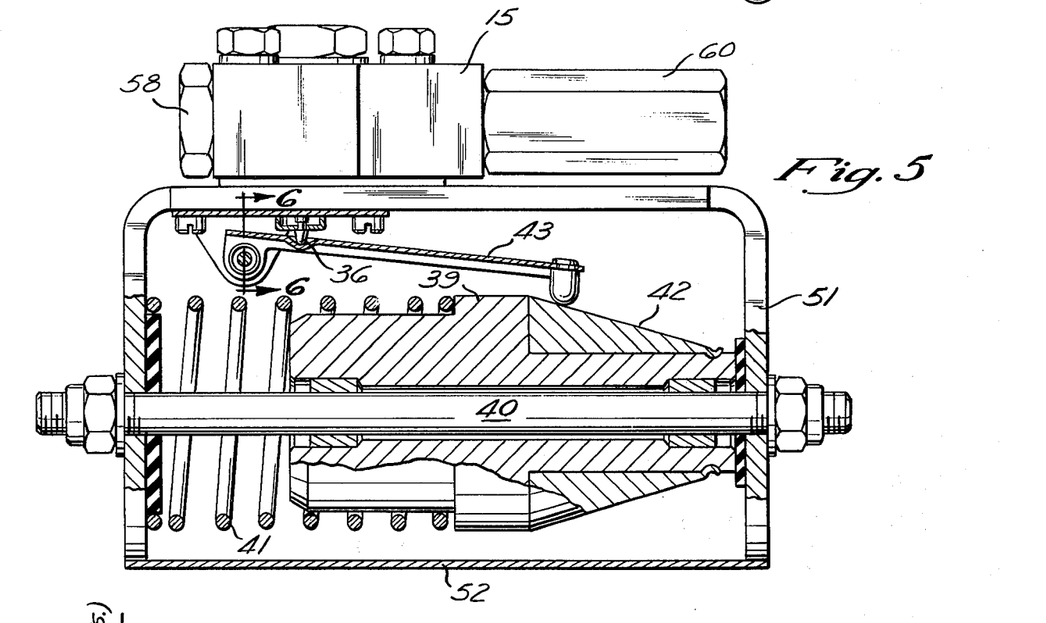
FIG. 5 is a top view of the proportioning valve and control circuit shown in FIG. 4, with the inertia weight of the control circuit shown in cross-section.
Figure 6:
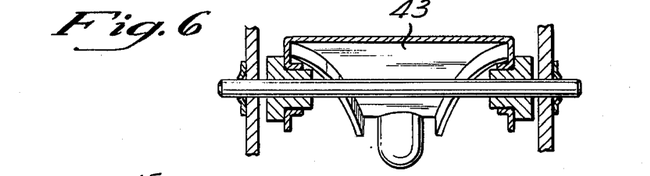
FIG. 6 is a view taken along reference view line 6—6 in FIG. 5.

The structural details of the inertia weight 39 and its related structure are best shown in FIGS. 4, 5 and 6. The inertia weight 39 is provided with a suitable anti-friction material for its sliding movement on the rod 40 and with a suitable anti-friction material on its cam surface 42. The rod 40 is supported on a generally U-shaped bracket 51 which is bolted to the housing of the proportioning valve 15 (FIG. 4). A suitable metal cover 52 is secured to the housing 51 to protect the inertia weight 39 and its related parts against contamination.

The inertia weight 39 is positioned on the vehicle so that the rod 40 is disposed in a horizontal plane and is arranged parallel to the longitudinal axis of the vehicle, and so that the left end of the inertia weight 39 as viewed in FIG. 5 faces the front of the vehicle and the right end of the inertia weight 39 faces the rear of the vehicle. This arrangement makes the inertia weight 39 self-compensating for the effects of gravity when the motor vehicle is traveling up or down a hill. If the vehicle is traveling up a hill, the front of the vehicle is higher than the rear of the vehicle and the rod 40 as viewed in FIG. 5 is tilted so that its left end is slightly higher than its right end. This means that the inertia weight 39 has to move against the bias of the spring 40 and has to move against the gravitational pull of its own weight in order to permit closing of the shut-off valve 38. This results in a slightly higher deceleration rate being required to move the inertia weight when the vehicle is traveling up hill than when the vehicle is on a level surface. This is desirable because, when the vehicle is traveling up a hill, a greater portion of the vehicle weight is carried by the rear wheels so that a higher braking pressure can be provided to the rear wheel brakes without locking the rear wheels. Similarly, when the vehicle is traveling down a hill, the right end of the rod 40 as viewed in FIG. 5 is higher than the left end so that the gravitational pull on the inertia weight 39 in a direction along the rod 40 results in a lower rate of deceleration moving the inertia weight 39 to close the shut-off valve 38. In this manner, the control circuit 16 provides a slightly higher control signal pressure in the outlet 21 when the vehicle is traveling up a hill and provides a slightly lower control signal pressure in the outlet 21 when the vehicle is traveling down a hill. The effect of the control signal pressure is discussed in detail below with reference to the proportioning valve 15.

STRUCTURE AND OPERATION OF PROPORTIONING VALVE AS MODIFIED BY CONTROL CIRCUIT

The structure of the proportioning valve 15 is best shown in FIG. 2. The proportioning valve 15 includes a housing 56 having a bore 57 extending longitudinally therethrough. A left plug member 58 is threadably received in the left end of the bore 57 and provides an inlet 59 for the proportioning valve 15. A right plug member 60 is threadably received in the right end of the bore 57 and provides an outlet 61 for the proportioning valve 51.

A generally cylindrical insert 62 is disposed in the bore 57. The left end face of the insert 62 is notched to permit open fluid pressure communication between the proportioning valve inlet 59 and the control circuit inlet 20 under all conditions. The right end of the insert 62 cooperates with the bore 57 to define an annular control chamber 63 therebetween. A stop member 64 is rigidly secured to the insert 62 for positioning the proportioning valve poppet in a manner described below. The plugs 58 and 60, the insert 62 and the stop member 64 are made as separate pieces to facilitate manufacture and assembly of the proportioning valve 15. These parts all remain stationary during the operation of the proportioning valve 15 and are considered as forming a part of the housing 56.

A pressure reducing proportioning piston 68 is slidably disposed in the bore 57. The proportioning piston 68 includes a smaller diameter portion 69 at its left end of net annular cross-sectional area $A_1$ exposed to the fluid pressure of the proportioning valve inlet 59 under all conditions. The proportioning piston 68 also includes a larger diameter portion 70 at its right end having a net annular cross-sectional area $A_2$ exposed to the pressure of the outlet 61 under all conditions. The proportioning piston 68 also includes a bore 73 extending axially from end to end therethrough and an annular valve head 74 formed at the left end face of the smaller diameter portion 69.

A generally cylindrical control sleeve 78 and an elastomeric seal 79 of net annular cross-sectional area $A_3$ exposed to the fluid pressure of the control chamber 63 are slidably disposed in the control chamber 63. A coil spring 81 is disposed in the bore 57 on the exterior of the proportioning piston 68. The spring 81 has a relatively high preload and acts between the control sleeve 78 and a washer 82 which abuts a shoulder on the plug 60 and a shoulder on the larger diameter portion 70 of the proportioning piston 68. A seal 84 on the smaller diameter portion 69 of the proportioning piston 68 and a seal 85 on the larger diameter portion 70 of the proportioning piston 68 prevent leakage of fluid on the inlet and outlet sides of the proportioning valve 15, respectively. A vent passage 86 provides an atmospheric reference for the area differential between the smaller diameter portion 69 and the larger diameter portion 70, and a suitable dust protector is provided in the vent passage 86.

A cylindrical poppet carrier 87 is rigidly secured to the plug 58 and may also be considered a part of the housing 56. A valve seat or poppet 88 is slidably disposed in the carrier 87 and is biased by a light spring 89 to the right against the stop member 64 to accurately position the poppet 88 in the bore 57. A C-shaped spring clip 90 is provided to retain the poppet 88 in the carrier 87 prior to and during assembly of the plug 58.

Figure 7:
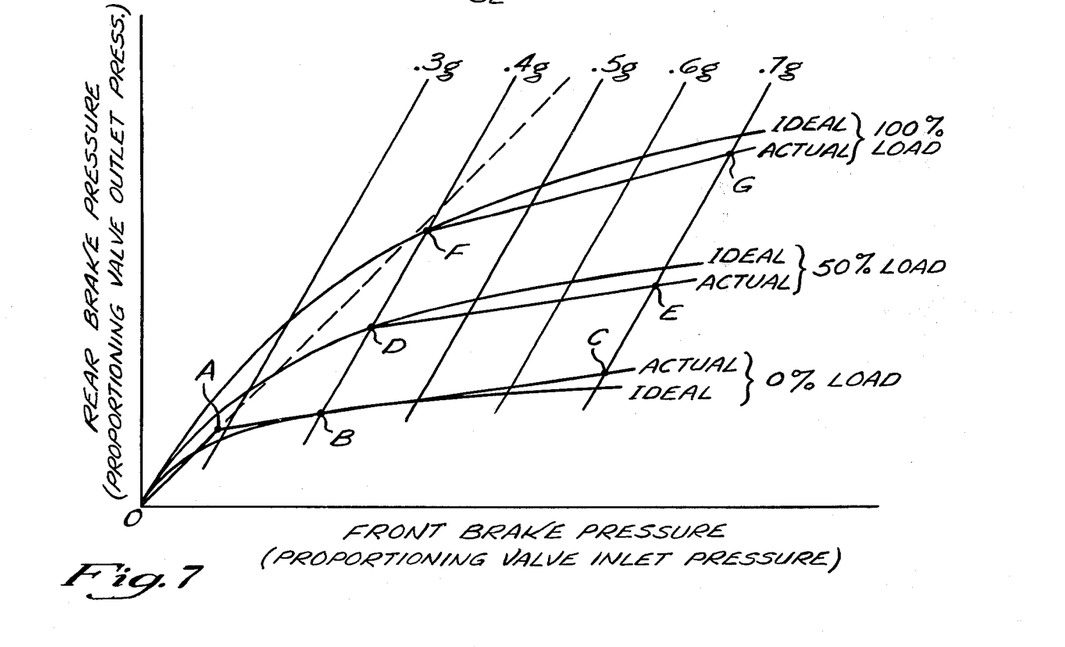
FIG. 7 is a graphical representation of the relationship between inlet and outlet pressures of the proportioning valve shown in FIG. 1, with the theoretically ideal pressure curves for various vehicle loading conditions shown thereon.

The operation of the proportioning valve 15 as modified by the control circuit 16 is best understood by reference to FIG. 7. FIG. 7 is a graphical representation of the relationship between front brake pressure acting on the slave cylinders of the front wheels 13 and rear brake pressure acting on the slave cylinders of the rear brakes 17. Since the front brake pressure is the same as the inlet pressure to the proportioning valve inlet 59, and since the rear brake pressure is the same as the pressure in the proportioning valve outlet 61, FIG. 7 may also be viewed as a graphical representation of inlet and outlet pressures of the proportioning valve 15.

The curved lines in FIG. 7 indicate the theoretically ideal front and rear braking pressures which will provide front and rear brake torques which are proportional to the front and rear wheel loads under various loading conditions of the vehicle. For example, the front and rear pressures indicated at any point on the lowermost curved line on the graph will provide front and rear brake torques which are proportional to the loads carried by the front and rear wheels when the vehicle is empty. Similarly, any point on the uppermost curved line on the graph shows the front and rear pressures which will provide front and rear brake torques which are proportional to the loads carried by the front and rear wheels when the vehicle is loaded to 100 percent of its capacity, and the middle curved line is a similar showing for the vehicle when it is loaded to 50 percent of its capacity. Other similar curves can be drawn for any other loading condition of the vehicle such as a 10 percent load or a 90 percent load.

The dotted straight line in FIG. 7 is a 45° line for reference which shows equal front and rear brake pressures at any point along the line.

The solid straight lines in FIG. 7 which are inclined at an angle of about 60° to the horizontal and which are labeled 0.3g, 0.4g, 0.5g, 0.6g, and 0.7g are deceleration lines. These deceleration lines connect the points on the curved pressure lines which provide the theoretically ideal front and rear braking pressures at the indicated deceleration rate. For example, the location at which the 0.3g deceleration line intersects the 0 percent load curved line shows the theoretically ideal front and rear brake pressures which will provide front and rear brake torques which are proportional to the front and rear wheel loads when the vehicle is empty and which will decelerate the vehicle at 0.3g (so long as the coefficient of friction of the road surface is sufficient to decelerate the vehicle at 0.3g). Viewed in another way, these deceleration lines show the theoretically ideal front and rear brake pressures for any given rate of deceleration when the vehicle is being decelerated without skidding to the limits of the coefficient of friction of the road surface, so that any greater pressures would cause skidding on such road surface.

Referring now to FIGS. 2 and 7 together, when pressure begins to build in the lines 11 and 12 by actuation of the master cylinder 10, fluid begins to flow into the proportioning valve inlet 59. This relatively low pressure fluid follows the direction of the arrows in FIG. 2 and flows through the open space between the valve head 74 and the right end face of the poppet 88, through the bore 73, and out the outlet 61 to the slave cylinders of the brakes of the rear wheels 17. This low pressure fluid is also communicated to the control chamber 63 through the control circuit outlet 21. The proportioning piston 68 and the control sleeve 78 remain stationary during this portion of the operation, and this portion of the operation of the valve 15 is shown by line OA (which is a 45° line indicating a one to one relationship between front brake pressure and rear brake pressure) in FIG. 7.

When the front and rear brake pressures reach the pressures indicated at point A, the control sleeve 78 still does not move. However, the proportioning piston 68 moves to the left and the valve seat 74 cooperates with the right end face of the poppet 88 to modulate or proportion further rear brake pressure increases. This is because the outlet area $A_2$ is greater than the inlet area $A_1$, so that the equal pressures acting on these two areas at point A creates a sufficient force unbalance on the proportioning piston 68 to overcome the preload of the spring 81 so that the proportioning piston 68 moves to the left.

Further increases in pressure in inlet port 59 above point A result in proportional but smaller increases in pressure in the outlet 61. This is because the area $A_1$ is smaller than the area $A_2$, so that greater increases in the pressure acting against the inlet area $A_1$ are necessary to counterbalance increases in outlet pressure acting against the area $A_2$. The valve head 74 and poppet 88 during this portion of the operation of the valve as shown in FIG. 2 operates according to the equation:

$$P_iA_1 + F_s = P_oA_2$$

wherein $P_i$ is the pressure in the inlet 59, $F_s$ is the force acting through the washer 82 on the piston 68 by the spring 81, and $P_o$ is the pressure in the outlet 61. This portion of the operation of the valve is shown as line AB in FIG. 7, and the slope of the line AB is equal to the ratio of the areas $A_1$ and $A_2$.

The proportioning valve 15 operates along the line OAB as the inlet pressure increases for deceleration rates of the vehicle below 0.4g. During this portion of the operation of the valve, the operation of the valve is not modified by the control circuit 16 and control sleeve 78 because the pressure in the control circuit outlet 21 and in the control cavity 63 is relatively small and is not sufficient to overcome the force of the spring 81. The reason for this may be understood by referring to FIGS. 7 and 8. As explained above, the inlet and outlet pressures of the control circuit 16 increase along line GH until a low pressure is reached at H. At this point, the return flow valve 29 closes and the hold-off valve 28 prevents further increases in outlet pressure as the inlet pressure continues to increase. The control circuit 16 operates along line GHI in FIG. 8 as the proportioning valve 15 is operating along line OAB in FIG. 7. The preload of the spring 30 of the hold-off valve 28 is set so that the hold-off valve 28 opens at point I in FIG. 8 at the same time as the proportioning valve reaches point B in FIG. 7.

When the control circuit outlet pressure reaches the pressure level indicated at point I in FIG. 7, such control pressure acting against the area $A_3$ of the control sleeve 78 begins to overcome the force of the spring 81 and begins to modify the operation of the proportioning valve 15.

If the vehicle is empty (that is, 0 percent load), the shut-off valve 38 of the control circuit (FIG. 1) will close if there are any further increases in inlet and outlet pressures of the proportioning valve 15 beyond point B or point I. This is because any such further increases in braking pressure beyond point B in FIG. 7 will result in a deceleration rate of the empty vehicle of 0.4g or greater, thereby causing the inertia weight 39 to move to the left (FIG. 1) to close the shut-off valve 38. This terminates any further pressure increases in the control circuit outlet 21 and the control chamber 63, so that the alteration of the proportioning characteristics of the proportioning valve 15 is terminated due to the pressure in the control circuit outlet 21 being insufficient to move the sleeve 78 to the right against the bias of the spring 81 as viewed in FIG. 2. As the operator pushes still harder on the brake pedal, the front and rear brake pressures increase along line BC in FIG. 7 and the valve proportioning characteristics are unaltered so that the valve follows the equation set out above. During this portion of the operation of the proportioning valve along line BC in FIG. 7 for an empty vehicle, the control circuit operates along line II$_1$ in FIG. 8 because of the shut-off valve 38 being closed.

When the motor vehicle is loaded to 50 percent of its capacity and the brakes are initially applied to stop the vehicle, the proportioning valve 15 operates along a line OAB in FIG. 7 in the same manner as when the vehicle has no load. However, when point B is reached, the pressures in the front and rear brakes are not sufficient to decelerate the 50 percent loaded vehicle at the fixed deceleration rate of 0.4g. Because of this, the inertia weight 39 does not move at point B so that the shut-off valve 38 of the control circuit (FIG. 1) remains open. Further increases in pressure in the control circuit inlet 20 then produce further increases in pressure in the control circuit outlet 21 along line IJ (FIG. 8) as explained above. This increased pressure in the control chamber 63 causes the control seal 79 and the control sleeve 78 to being to move to the right as shown in FIG. 2 to increase the load on the spring 81.

When the control circuit 16 begins to operate along line IJ in FIG. 8 in this manner, the proportioning valve 15 begins to operate along a line BD which approximates the fixed 0.4 g deceleration curve in FIG. 7. During this portion of the operation of the valve, the proportioning valve 15 operates according to the equation:

$$P_iA_1 + P_cA_3 = P_oA_2,$$

where $P_c$ is the pressure in the control chamber 63. In this equation, the force $P_cA_3$ continuously increases as long as $P_c$ continues to increase along line IJ. This causes the proportioning valve to operate along a line BD which closely approximates the fixed 0.4g deceleration line in FIG. 7.

When point D is reached in FIG. 7, any further increases in the front and rear brake pressures become sufficient to decelerate the 50 percent loaded vehicle at the fixed deceleration rate of 0.4g. This causes the inertia weight 39 to move to its displaced position to close the shut-off valve 38 and lock-in the control pressure in the control circuit outlet 21. This prevents any further increases in the pressure in the control circuit outlet 21 and control chamber 63 so that the force $P_cA_3$ remains constant during further increases in brake pressure.

As the brake pressures continue to build, the proportioning valve 15 follows the line DE in FIG. 7 until a desired decleration rate (0.7g in the example illustrated in FIG. 7) is reached. The equation for the line DE is the same as the last equation set forth herein but with the force $P_cA_3$ being a constant. The line DE closely approximates the theoretically ideal curved pressure line for a 50 percent loaded vehicle and has a slope parallel to the slope of line AB as determined by the proportional relationship between the areas $A_1$ and $A_2$. As the proportioning valve 15 operates along line DE in FIG. 7 in this manner, the control circuit 16 operates along line JJ$_1$ in FIG. 8 because the shut-off valve 38 is closed due to the deceleration rate exceeding 0.4g.

When the motor vehicle is fully loaded to 100 percent of its capacity and the master cylinder pressures initially increase, the proportioning valve 15 operates along the line OAB in FIG. 7 and the control circuit 16 does not modify the operation of the proportioning valve. Again, as with the 50 percent loaded vehicle, the pressures at point B in FIG. 7 are not sufficient to decelerate the 100 percent loaded vehicle at the fixed deceleration rate of 0.4g. Because of this, the inertia weight 39 does not move at point B and the shut-off valve 38 remains open so that the control pressure begins to increase along line IJK as the braking pressures are further increased. During this stage of the operation of the valve, the proportioning valve 15 again operates along a line closely approximating the fixed 0.4g deceleration line in FIG. 7 according to the equation set forth above in connection with the explanation of the 50 percent loaded vehicle.

When point F is reached in FIG. 7, any further increases in the front and rear brake pressures become sufficient to decelerate the 100 percent loaded vehicle at the fixed 0.4g rate. This again causes the inertia weight 39 to move to its displaced position to close the shut-off valve 38 and lock-in the control pressure illustrated at point K in FIG. 8.

When the brake pressures are still further increased the valve then acts along line FG in FIG. 7 until the desired deceleration rate (0.7g in the example shown in FIG. 7) is reached. The equation for the line FG is the same as the last equation set forth herein but with the force $P_cA_3$ being a constant because the control pressure $P_c$ does not increase further. This line FG has the same slope as the lines AB and DE, again due to the ratios of the areas $A_1$ and $A_2$. As shown in FIG. 7, this line FG closely approximates the ideal front and rear brake pressure curves for the 100 percent loaded vehicle. During this portion of the operation of the proportioning valve 15 along line FG in FIG. 7, the control circuit 16 operates along line $KK_1$ in FIG. 8 because of the closing of the shut-off valve 38.

The proportioning valve 15 operates in this manner not only at the three particular loading conditions illustrated in FIG. 7, but also at any partial loading condition whatsoever along line BDF, since the fixed deceleration rate of 0.4g will be reached as the pressures increase above the pressures on line BDF for any such loading condition of the vehicle.

When the desired higher deceleration rate (0.7g in the example shown in FIG. 7) is reached for any loading condition of the vehicle and the master cylinder pressure is decreased, the trapped control signal remains locked in the control pressure cavity 63 until the pressure in the control circuit inlet 20 decreases to a pressure level equal to or less than the pressure in the outlet 21. This is because the pressure on the inlet side of the shut-off valve member 34 maintains the shut-off valve member 34 in its closed position. When the pressure in the control circuit inlet 20 becomes equal to or less than the pressure in the control circuit outlet 21, the spring 35 opens the shut-off valve 38 to permit a decrease in the control pressure signal.

Because the control signal in the control chamber 63 is maintained even after the braking pressures begin to decrease, the proportioning valve 15 acts along line GF for a 100 percent loaded vehicle, along line ED for a 50 percent loaded vehicle, and along line CB for a 0 percent loaded vehicle during decreasing pressures. This is because the proportioning piston 68 and valve poppet 88 can move together to the left as viewed in FIG. 2 when the pressure in the inlet 59 is decreased to provide an increased volume and consequent decreased pressure in the outlet 61. This action of the proportioning piston 68 and poppet 88 during decreasing pressures is explained in greater detail in U.S. Pat. No. 3,667,810 to Richard J. Silagy, the entirety of which is incorporated herein by reference. The proportioning valve 15 continues to decrease along an extension of these lines after the points F, D or B are reached (depending upon the loading condition of the vehicle), until the point is reached at which the pressure in the inlet 59 is less than the pressure in the outlet 61. At this point, further decreases in pressure in the inlet 59 cause the poppet 88 to move to the left away from the valve head 74 so that further decreases in inlet pressure are met with equal decreases in outlet pressure as the pressures decrease to point O in FIG. 7. The poppet 88 moves away from the valve head 74 in this manner because a small annular shoulder on the outer periphery of the piston 68 engages the rightmost end face of the insert 62 to limit movement of the piston 68 to the left while the poppet 88 is still capable of further leftward movement. This movement of the poppet 88 away from the valve head 74 is also explained in greater detail in the above referenced U.S. Pat. No. 3,667,810.

What is claimed is:

1. A motor vehicle hydraulic brake system comprising a front brake circuit, a rear brake circuit having a pressure proportioning valve for reducing the pressure supplied to the rear wheel brakes relative to the pressure supplied to the front wheel brakes, and control means altering the pressure proportioning characteristics of the proportioning valve in accordance with the load of the vehicle; said proportioning valve including an inlet, an outlet, a bore connecting said inlet and outlet, a proportioning piston slidably disposed in said bore and having a net inlet area exposed to fluid pressure in said inlet and a net outlet area exposed to fluid pressure in said outlet, valve means responsive to movement of said proportioning piston in said bore maintaining increases in outlet pressure proportional to but less than increases in inlet pressure by a predetermined proportional relationship under first predetermined conditions; said control means including a control chamber and a control member operatively connected to said valve means and having a predetermined area slidably disposed in said control chamber, said control member being constructed and arranged to urge said valve means open in response to the fluid pressure in said control chamber under second predetermined conditions, and inertia responsive valve means preventing increases in pressure in said control chamber and locking said control chamber pressure in said control chamber during increases in inlet pressure under third predetermined conditions.

2. A motor vehicle hydraulic brake system as defined in claim 1 wherein said inertia responsive valve means includes passage means establishing fluid communication between said inlet and said control chamber, a valve member in said passage for opening and closing said passage, and an inertia weight constructed and arranged to close said valve member under said third predetermined conditions.

3. A motor vehicle hydraulic brake system as defined in claim 2 including a hold-off valve member in said passage constructed and arranged to maintain the fluid pressure in said control chamber below a predetermined control chamber pressure level under said first predetermined conditions.

4. A motor vehicle hydraulic brake system comprising a front brake circuit, a rear brake circuit having a pressure proportioning valve for reducing the pressure supplied to the rear wheel brakes relative to the pressure supplied to the front wheel brakes, and control means altering the pressure proportioning characteristics of the proportioning valve in accordance with the load of the vehicle; said proportioning valve including an inlet, and outlet, a bore connecting said inlet and outlet, a proportioning piston slidably disposed in said bore and having a net inlet area exposed to fluid pressure in said inlet and a net outlet area exposed to fluid pressure in said outlet, valve means responsive to movement of said proportioning piston in said bore maintaining increases in outlet pressure proportional to but less than increases in inlet pressure by a first predetermined proportional relationship when the rate of deceleration of said system is less than a predetermined deceleration rate and the inlet and outlet pressures are greater than first predetermined pressure levels and less than second predetermined pressure levels, and a spring urging said proportioning piston in a direction to open said valve means; said control means includes a control chamber and a control member operatively connected to said proportioning piston and having a predetermined area slidably disposed in said control chamber, said control member being constructed and arranged to urge said proportioning piston in a direction to open said valve means in response to the fluid pressure in said control chamber when the rate of deceleration of said system is less than said predetermined deceleration rate and the inlet and outlet pressure are greater than said second predetermined pressure levels, and inertia responsive valve means, said inertia responsive valve means including passage means supplying fluid pressure to said control chamber and a valve member for opening and closing said passage and an inertia weight, and said inertia weight being operatively connected to said valve member to close said passage for preventing increases in pressure in said control chamber when the rate of deceleration of said system is greater than said predetermined deceleration rate.

5. A motor vehicle hydraulic brake system as defined in claim 4 wherein said control member is constructed and arranged to maintain increases in outlet pressure proportional to but greater than increases in inlet pressure by a second predetermined proportional relationship when the rate of deceleration of said system is less than said predetermined deceleration rate and the inlet and outlet pressures are greater than said second predetermined pressure levels.

6. A motor vehicle hydraulic brake system as defined in claim 5 including means rendering said control member inoperable to maintain said second predetermined proportional relationship when the rate of deceleration of said system is greater than said predetermined rate.

7. A motor vehicle hydraulic brake system as defined in claim 6 wherein said means rendering said control member inoperable includes said inertia responsive valve means.

8. A motor vehicle hydraulic brake system as defined in claim 7 wherein said inertia responsive valve means locks said control chamber pressure in said control chamber when said deceleration rate is greater than said predetermined deceleration rate.

9. A motor vehicle hydrualic brake system as defined in claim 8 wherein said proportioning valve means responsive to movement of said proportioning piston in said bore maintains increases in outlet pressure proportional to but less than increases in inlet pressure by said first predetermined proportional relationship when the rate of deceleration of said system is greater than said predetermined deceleration rate.

10. A motor vehicle hydraulic brake system as defined in claim 8 wherein said proportioning valve includes a housing, said passage means is in said housing and establishes fluid communication between said inelt and said control chamber, and said valve member is in said passage for opening and closing said passage.

11. A motor vehicle hydraulic brake system as defined in claim 10 wherein said inertia weight is sildably mounted on the exterior of said housing, and an actuator operatively connects said inertia weight and said valve member.

12. A motor vehicle hydraulic brake system as defined in claim 10 including a hold-off valve member in said passage, and said hold-off valve member being constructed and arranged to maintain the fluid pressure in said control chamber below a predetermined control chamber pressure level when said inlet and outlet pressures are less than said second predetermined pressure levels, whereby said control member is inoperable to maintain said second predetermined proportional relationship when said inlet and outlet pressures are less than said second predetermined pressure levels.

13. A motor vehicle hydraulic brake system as defined in claim 5 including hold-off valve means maintaining the fluid pressure in said control chamber below a predetermined control chamber pressure level when said inlet and outlet pressures are less than said second predetermined pressure levels, whereby said control member is inoperable to maintain said second predetermined proportional relationship when said inlet and outlet pressures are less than said second predetermined pressure levels.

14. A motor vehicle hydraulic brake system comprising a front brake circuit, a rear brake circuit having a pressure proportioning valve for reducing the pressure supplied to the rear wheel brakes relative to the pressure supplied to the front wheel brakes, and control means altering the pressure proportioning characteristics of the proportioning valve in accordance with the load of the vheicle; said proportioning valve including an inlet, an outlet, a bore connecting said inlet and outlet, a proportioning piston slidably disposed in said bore and having a net inlet area exposed to fluid pressure in said inlet and a net outlet area exposed to fluid pressure in said outlet, valve means responsive to movement of said proportioning piston in said bore maintaining increases in outlet pressure proportional to but less than increases in inlet pressure by a first predetermined proportional relationship when the rate of deceleration of said system is less than a predetermined deceleration rate and the inlet and outlet pressures are greater than first predetermined pressure levels and less than second predetermined pressure levels, a spring urging said proportioning piston in a direction to open said valve means, and said first predetermined proportional relationship being $$P_i A_1 + F_s = P_o A_2$$

where $P_i$ is said inlet pressure, $A_1$ is said inlet area, $F_s$ is said spring force, $P_o$ is said outlet pressure, and $A_2$ is said outlet area; said control means includes a control chamber and a control member acting against said spring and having a predetermined area slidably disposed in said control chamber, said control member being constructed and arranged to increase the force of said spring urging said valve means open in response to the fluid pressure in said control chamber when the rate of deceleration of said system is less than said predetermined deceleration rate and the inlet and outlet pressures are greater than said second predetermined pressure levels, said control member maintaining increases in outlet pressure proportional to but greater than increases in inlet pressure by a second predetermined proportional relationship when the rate of deceleration of said system is less than said predetermined deceleration rate and the inlet and outlet pressures are greater than said second predetermined pressure levels, and said second predetermined proportional relationship being $$P_i A_1 + P_c A_3 = P_o A_2$$

where $P_c$ is said control chamber pressure and $A_3$ is said area of said control member exposed to control chamber pressure.

15. A motor vehicle hydraulic brake system as defined in claim 14 including means rendering said control member inoperable to maintain said second predetermined proportional relationship when the rate of deceleration of said system is greater than said predetermined rate.

16. A motor vehicle hydraulic brake system as defined in claim 15 wherein said proportioning valve means responsive to movement of said proportioning piston in said bore maintains increases in outlet pressure proportional to but less than increases in inlet pressure by said first predetermined proportional relationship when the rate of deceleration of said system is greater than said predetermined deceleration rate.

17. A motor vehicle hydraulic brake system comprising a front brake circuit, a rear brake circuit having a pressure proportioning valve for reducing the pressure supplied to the rear wheel brakes relative to the pressure supplied to the front wheel brakes, and a control means altering the pressure proportioning characteristics of the proportioning valve in accordance with the load of the vehicle; said proportioning valve including an inlet, an outlet, a bore connecting said inlet and outlet, a proportioning piston slidably disposed in said bore and having a net inlet area exposed to fluid pressure in said inlet and a net outlet area exposed to fluid pressure in said outlet, proportioning valve means responsive to movement of said proportioning pistion in said bore maintaining increases in outlet pressure proportional to but less than increases in inlet pressure by a first predetermined proportional relationship when the rate of deceleration of said system is less than a predetermined deceleration rate and the inlet and outlet pressures are greater than first predetermined pressure levels and less than second predetermined pressure levels; said control means including first means rendering said control means inoperable to alter the pressure proportioning characteristics of the proportioning valve when the proportioning valve inlet and outlet pressures are less than said second predetermined pressure levels, second means acting on said valve means in cooperation with said proportioning piston maintaining increases in outlet pressure proportional to but greater than increases in inlet pressure by a second predetermined proportional relationship when the rate of deceleration of said system is less than said predetermined deceleration rate and the inlet and outlet pressures are greater than said second predetermined pressure levels, and third means rendering said second means inoperable to maintain said second predetermined proportional relationship when the rate of deceleration of said system is greater than said predetermined deceleration rate; and said proportioning valve means responsive to movement of said proportioning pistion in said bore maintaining increases in outlet pressure proportional to but less than increases in inlet pressure by said first predetermined proportional relationship when the rate of deceleration of said system is greater than said predetermined deceleration rate.

18. A motor vehicle hydraulic brake system as defined in claim 16 wherein said second means includes a control member operatively connected to said valve means and urging said valve means open when the rate of deceleration of said system is less than said predetermined deceleration rate and the inlet and outlet pressures are greater than said second predetermined pressure levels.

19. A motor vehicle hydraulic brake system as defined in claim 18 wherein said second means includes a control pressure chamber in which said control member is slidably disposed, and said control member is constructed and arranged to urge said valve means open in response to the fluid pressure in said control chamber.

20. A motor vehicle hydraulic brake system as defined in claim 19 wherein said third means includes inertia responsive valve means preventing increases in pressure in said control chamber when said deceleration rate of said system is greater than said predetermined deceleration rate.

21. A motor vehicle hydraulic brake system as defined in claim 19 wherein said first means includes a hold-off valve constructed and arranged to maintain the fluid pressure in said control chamber below a predetermined control chamber pressure level when said inlet and outlet pressures are less than said second predetermined pressure levels.

22. A motor vehicle hydraulic brake system as defined in claim 17 wherein said proportioning valve includes a spring urging said proportioning piston in a direction to open said valve means, and said second means includes means to increase the force of said spring urging said proportioning piston in a direction to open said valve means when the rate of deceleration of said system is less than said predetermined decleration rate and the inlet and outlet pressures are greater than said second predetermined pressure levels.

23. A motor vehicle hydraulic brake system as defined in claim 22 wherein said means to increase the force of said spring includes a control member acting against said spring and being slidably disposed in a control chamber, and said control member is constructed and arranged to increase the force of said spring in response to the fluid pressure in said control chamber.

24. A motor vehicle hydraulic brake system as defined in claim 23 wherein said first predetermined proportional relationship is $$P_i A_1 + F_s = P_o A_2$$

where $P_i$ is said inlet pressure, $A_1$ is said inlet area, $F_s$ is said spring force, $P_o$ is said outlet pressure, and $A_2$ is said outlet area; and said second predetermined proportional relationship is $$P_i A_1 + P_c A_3 = P_o A_2$$

where $P_c$ is said control chamber pressure and $A_3$ is the net area of said control member exposed to control chamber pressure.

* * * * *